(12) United States Patent
Kendall et al.

(10) Patent No.: US 12,404,039 B2
(45) Date of Patent: Sep. 2, 2025

(54) SYSTEMS AND METHODS FOR ASSEMBLING STIFFENED COMPOSITE STRUCTURES

(71) Applicant: The Boeing Company, Chicago, IL (US)

(72) Inventors: James Russell Kendall, Mt. Pleasant, SC (US); Byron James Autry, Charleston, SC (US); Santiago Mejia, Charleston, SC (US)

(73) Assignee: The Boeing Company, Arlington, VA (US)

( * ) Notice: Subject to any disclaimer, the term of this patent is extended or adjusted under 35 U.S.C. 154(b) by 328 days.

(21) Appl. No.: 17/857,918

(22) Filed: Jul. 5, 2022

(65) Prior Publication Data

US 2024/0010357 A1    Jan. 11, 2024

(51) Int. Cl.
| | |
|---|---|
| *B64F 5/10* | (2017.01) |
| *B29C 70/34* | (2006.01) |
| *B29L 31/30* | (2006.01) |
| *B64C 1/06* | (2006.01) |
| *B64C 1/12* | (2006.01) |

(52) U.S. Cl.
CPC .............. *B64F 5/10* (2017.01); *B29C 70/342* (2013.01); *B64C 1/12* (2013.01); *B29L 2031/3082* (2013.01); *B64C 1/064* (2013.01)

(58) Field of Classification Search
None
See application file for complete search history.

(56) References Cited

U.S. PATENT DOCUMENTS

| | | | |
|---|---|---|---|
| 5,576,030 A * | 11/1996 | Hooper | B29C 70/547 425/389 |
| 6,918,985 B2 * | 7/2005 | Geyer | B29C 70/546 156/286 |
| 8,684,343 B2 | 4/2014 | Hiken et al. | |
| 2019/0210304 A1 * | 7/2019 | Wallace | B29B 11/16 |
| 2021/0023799 A1 * | 1/2021 | Santoni | B29C 51/10 |

FOREIGN PATENT DOCUMENTS

EP    2623302 A1 *    8/2013    ............. B29C 70/44

* cited by examiner

*Primary Examiner* — Barbara J Musser
(74) *Attorney, Agent, or Firm* — Kolitch Romano Dascenzo Gates LLC (57) ABSTRACT

Systems (100) for assembling stiffened composite structures comprise a layup mandrel (102) and a network (104) of fluid lines (116) configured to be selectively and fluidically coupled to string bladders (118) positioned relative to the layup mandrel (102).

23 Claims, 8 Drawing Sheets

SYSTEMS AND METHODS FOR ASSEMBLING STIFFENED COMPOSITE STRUCTURES

FIELD

The present disclosure relates to systems and methods of assembling stiffened composite structures.

BACKGROUND

Stiffened composite structures are structures that are constructed of composite materials, such as fiber reinforced composite materials, and typically include some form of structural frame that carries a skin. Some modern aircraft fuselages are examples of stiffened composite structures that include a skin operatively coupled to frame members that extend circumferentially around and that are spaced longitudinally along the inside of the fuselage and stringers that extend longitudinally along the inside of the fuselage and that are spaced circumferentially around the inside of the fuselage. Stiffened composite fuselages may be constructed utilizing an inner mold line layup mandrel that includes stringer cavities, or forms, that extend longitudinally along the mandrel. Typical stringers, such as hat-shaped stringers, define cavities themselves, with these cavities needing to be filled with a structure that will result in a flush surface to which the skin may be applied. These filler structures often are referred to as stringer mandrels or stringer bladders. Some stringer bladders are solid and made of a rubber or similar material. Other stringer bladders are hollow. Once the skin is applied over the stringers and the stringer bladders on the inner mold line layup mandrel, the stringers and skin are vacuum-compacted and co-cured in an autoclave. The vacuum compacting process utilizes a flexible sheet of material and sometimes caul plates that collectively extend across the stringers and skin and are sealed to the inner mold line layup mandrel around the outer perimeter of the stringers and skin. A vacuum is then applied between the sheet of material and the inner mold line layup mandrel to compact the stringers and skin together. When hollow stringer bladders are used, the internal volumes of the stringer bladders must be isolated from the vacuum and fluidically open to atmosphere to avoid the string bladders collapsing during the vacuum compacting process. This vacuum compacting process is referred to in the aerospace industry as "bagging" and is labor and time intensive. In particular, the integrity of the seal between the flexible sheet of material and the inner mold line layup mandrel is critical. Conventionally, the sheet of material, or "bag," is perforated by the vent lines that are connected to the internal volumes of the stringer bladders, resulting in numerous potential leak points.

SUMMARY

Systems for assembling stiffened composite structures comprise a layup mandrel and a network of fluid lines configured to be selectively and fluidically coupled to stringer bladders relative to the layup mandrel. In some examples, the network of fluid lines extends through the layup mandrel. Some systems further comprise one or more covers configured to be operatively coupled to the layup mandrel to define a passage extending along the layup mandrel, such that the network of fluid lines is positioned at least partially within the passage when the one or more covers are operatively coupled to the layup mandrel.

DESCRIPTION

Figure 1:
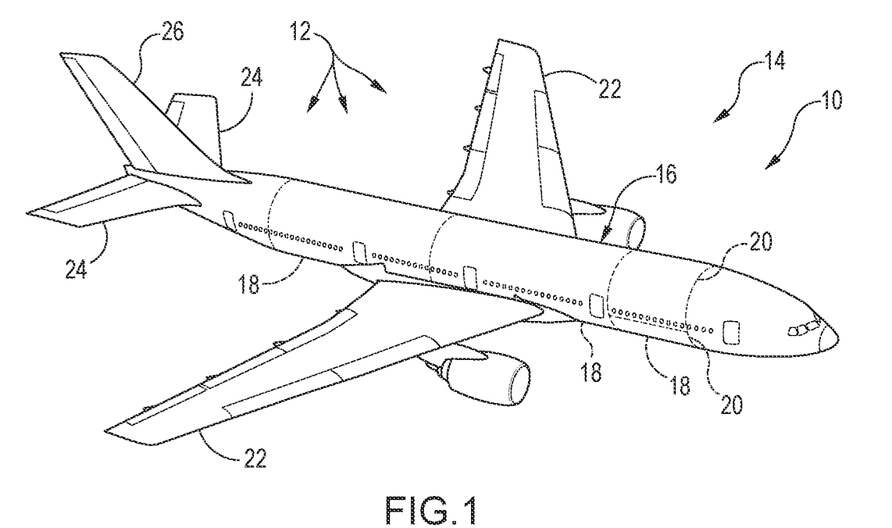
FIG. 1 is a perspective view of an example of a stiffened composite structure in the form of an aircraft.

Systems and methods for assembling stiffened composite structures are disclosed herein. In FIG. 1, an example of an apparatus 10 that may be constructed from stiffened composite structures 12 is provided in the form of an aircraft 14; however, other apparatuses 10 are within the scope of the present disclosure, and the present disclosure is not limited to aircraft and aircraft applications. For example, other apparatuses 10 that may be constructed of stiffened composite structures 12 include (but are not limited to) spacecraft, watercraft, land vehicles, wind turbines, structural towers and masts, etc. Moreover, aircraft 14 may take any suitable form, including commercial aircraft, military aircraft, private aircraft, or any other suitable aircraft. While FIG. 1 illustrates aircraft 14 in the form of a fixed wing aircraft, other types and configurations of aircraft are within the scope of aircraft 14 according to the present disclosure, including (but not limited to) helicopters and other rotorcraft.

Aircraft 14 include a fuselage 16, which generally corresponds to the main body of the aircraft 14 for holding passengers, crew, cargo, and/or equipment, for example, depending on the particular configuration and/or function of an aircraft 14. Typically, although not required, the fuselage 16 of an aircraft 14 is elongate and somewhat cylindrical or tubular. In some embodiments, the fuselage 16 may be constructed of multiple sections 18 that are longitudinally spaced along the fuselage 16 and operatively coupled together to define the fuselage 16. As used herein when referencing an aircraft 14, a fuselage 16, and/or a corresponding stiffened composite structure 12, the longitudinal direction refers to the fore-aft direction, corresponding to a longitudinal, or long, axis, of the fuselage 16. Additionally, the terms "inner" and "outer" when used in connection with an aircraft 14, a fuselage 16, and/or a corresponding stiffened composite structure 12 refer to the radially inward side and the radially outward side, respectively, of the corresponding stiffened composite structure. Accordingly, the outer side of a fuselage 16 or a component part thereof generally faces away from the fuselage 16, and the inner side of a fuselage 16 or a component part thereof generally faces the internal volume that is defined by the fuselage 16. Similar relative terms may be used with respect to stiffened composite structures 12 other than fuselages 16 and with respect to apparatuses 10 other than aircraft 14.

In FIG. 1, five fuselage sections 18 are indicated schematically, including a nose and tail section; however, any number or size and shape of sections 18 may be used to construct a fuselage 16. Sections 18 additionally or alternatively may be referred to as barrel sections 18 of a fuselage 16, with each barrel section 18 generally defining a length of the fuselage 16. Additionally or alternatively, as schematically illustrated in FIG. 1, a section 18 may include, or be constructed of, more than one subsection 20. In the schematically illustrated and optional example of FIG. 1, a section 18 is shown schematically and optionally to include an upper subsection 20 and a lower subsection 20; however, a section 18 may be constructed of any suitable number, configuration, and placement of subsections 20, including no subsections 20 at all.

Aircraft 14 also may include wings 22, horizontal stabilizers 24, and a vertical stabilizer 26, each of which may be constructed as a unitary structure or in subsections that are subsequently assembled together. One or more of a fuselage 16, a fuselage section 18, a fuselage subsection 20, a wing 22, a horizontal stabilizer 24, a vertical stabilizer 26, or a structural subsection thereof may be constructed of and/or may be described as a stiffened composite structure 12 according to the present disclosure.

Figure 2:
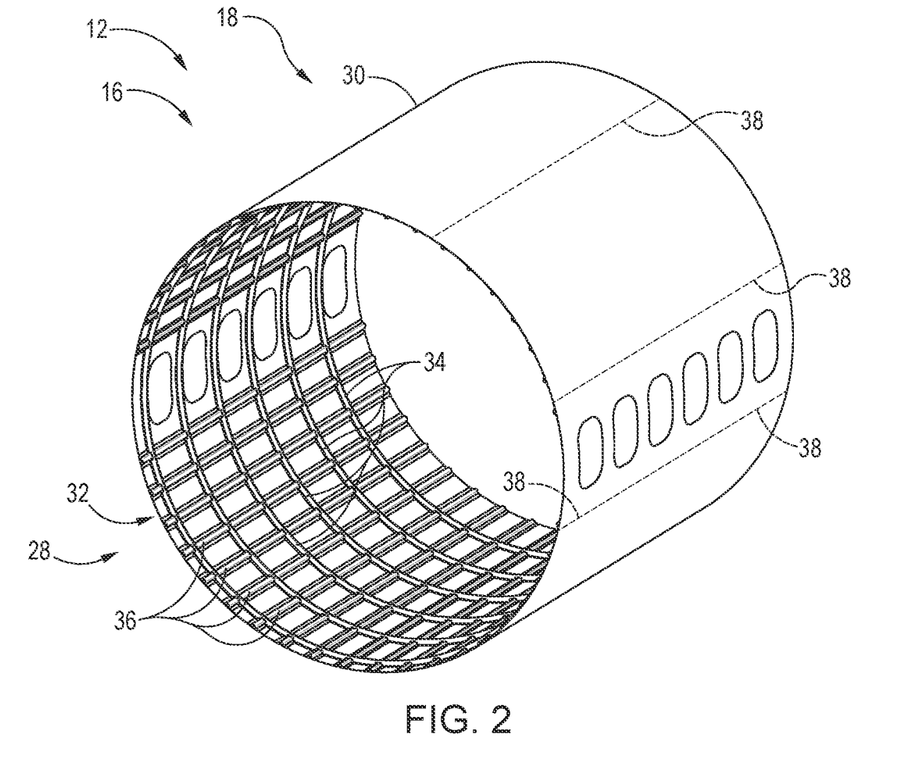
FIG. 2 is an isometric view of an example of a stiffened composite structure in the form of a barrel section of an aircraft.

Stiffened composite structures 12 according to the present disclosure generally encompass structures that are defined by a structural frame 28 and a skin 30 that is operatively coupled to and supported by the structural frame 28. FIG. 2 depicts an illustrative, non-exclusive example of a stiffened composite structure 12 in the form of a barrel section 18 of a fuselage 16 of an aircraft 14. The skin 30 may be described as defining the outer shape of the fuselage 16. As indicated in FIG. 2, structural frames 28 include a plurality of stiffeners 32 operatively coupled to the inner side of the skin 30. In the example of fuselage 16, the stiffeners 32 include a plurality of frame members, or frames, 34 that are operatively coupled to and that extend circumferentially around the inner side of the skin 30 and that are spaced longitudinally along the fuselage 16. The stiffeners 32 also include a plurality of stringers 36 that are operatively coupled to and that extend longitudinally along the inner side of the skin 30 and that are spaced circumferentially around the fuselage 16. In some embodiments of stiffened composite structures 12, although not required, the skin 30 may be constructed of a plurality of skin segments 38 that collectively define the skin 30, or at least a portion of the skin 30 of a stiffened composite structure 12.

Figure 3:
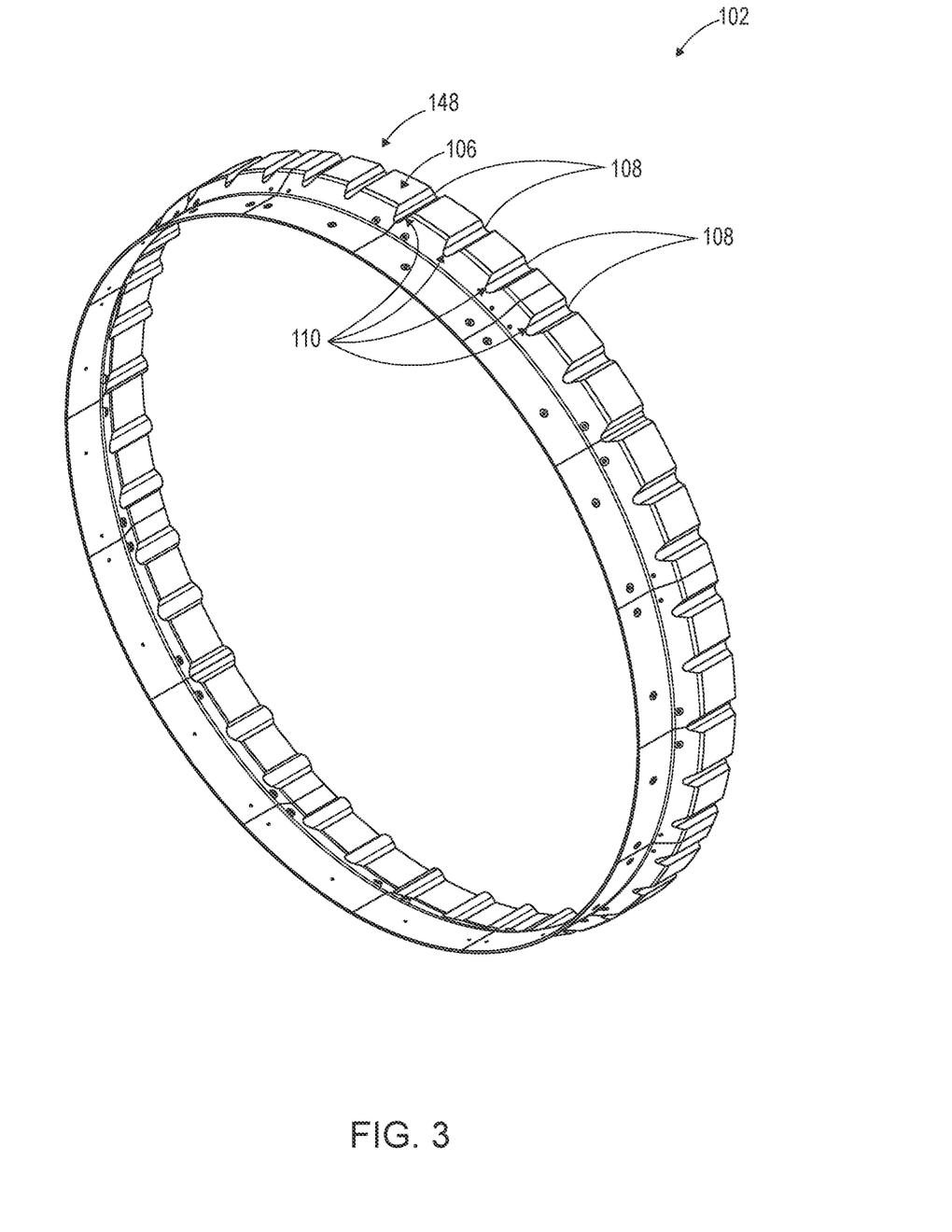
FIG. 3 is a representation of an example inner mold line layup mandrel for assembling a barrel section of an aircraft.

FIG. 3 schematically illustrates an example of a layup mandrel 102 that may be used to assemble stiffened composite structures 12. In the illustrated example, the layup mandrel 102 may be described as comprising an outer surface 106 that defines a plurality of spaced-apart stringer forms 108 that extend longitudinally along the outer surface 106, with each stringer form 108 having an outer surface that corresponds to one side of a respective stringer 36 that is to be loaded into the stiffener form 108. Each stringer form 108 also has an open end 110. The outer surface 106 of the layup mandrel 102 may be described as defining a primary skin contour 148 between the stringer forms 108 and that ultimately shapes the skin 30 of the stiffened composite structure 12 being assembled on the layup mandrel 102. The schematically represented example layup mandrel 102 of FIG. 3 is configured for assembling a cylindrical or other tubular structure, such as barrel section 18 of a fuselage 16 of an aircraft 14; however, layup mandrels 102 may take any suitable configuration depending on the construction of the stiffened composite structure 12 being assembled. The example layup mandrel 102 of FIG. 3 may be described as an inner mold line layup mandrel, because the layup mandrel 102 is used to form the stiffened composite structure 12 on a radially outward surface thereof; however, outer mold line layup mandrels also may be used in some systems and methods according to the present disclosure. Again, the example of FIG. 3 is provided as an example only.

Figure 4:
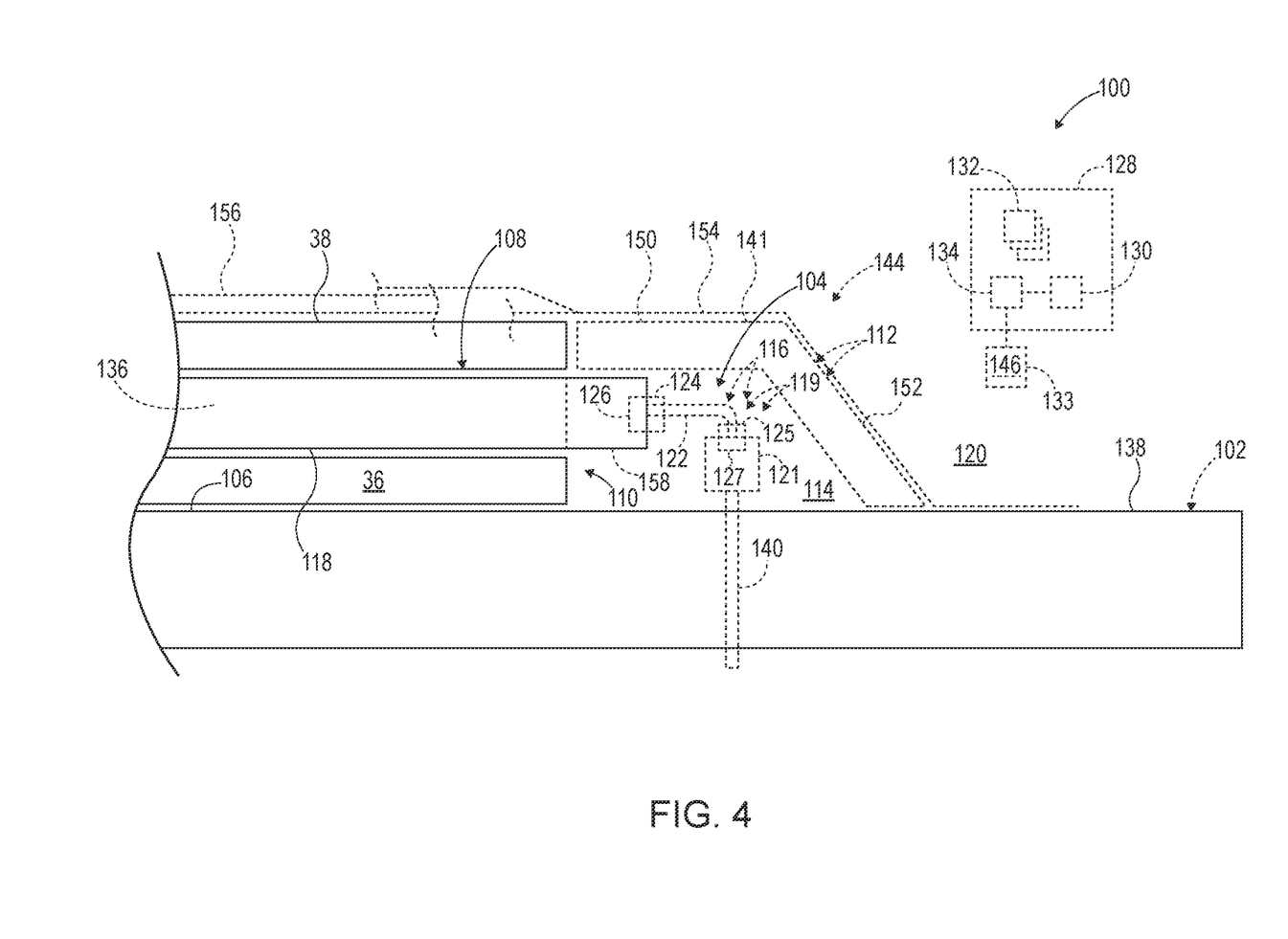
FIG. 4 is a schematic diagram representing systems for assembling stiffened composite structures.

Turning now to FIG. 4, systems 100 for assembling stiffened composite structures 12 are schematically represented. Generally, in FIG. 4, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure. As shown, systems 100 generally comprise at least a layup mandrel 102 and a network 104 of fluid lines 116. The network 104 of fluid lines 116 is configured to be selectively and fluidically coupled to stringer bladders 118 that are positioned relative to the layup mandrel 102.

Fluid lines 116 also may be referred to as pipes, piping, tubes, tubing, and the like. In some examples, the network 104 of fluid lines 116 is configured to be selectively and fluidically coupled to hollow stringer bladders 118 that are positioned relative to the layup mandrel 102. In particular, in some such examples, the network 104 of fluid lines 116 is fluidically open to atmosphere 120 so that internal volumes 136 of the stringer bladders 118, when fluidically coupled to the network 104 of fluid lines 116, are fluidically open to atmosphere 120. Accordingly, during a vacuum bagging operation, when a vacuum is drawn between a flexible sheet of material 154 and the layup mandrel 102, the hollow stringer bladders 118 will not collapse.

In some examples, and as schematically illustrated in FIG. 4, the network 104 extends through, or penetrates, the layup mandrel 102. By extending through the layup mandrel 102, the network 104 may be open to atmosphere 120 without effecting the vacuum during a vacuum bagging operation. In particular, the outer surface of the portion of the network 104 that penetrates the layup mandrel 102 (e.g. an outer surface of a fluid line 116) may be sealed with the layup mandrel 102 to ensure the integrity of the vacuum during a vacuum bagging operation. In this manner, there is no need for the fluid lines 116 to penetrate the flexible sheet of material 154, thereby avoiding perforations and possible leak points that would otherwise affect the integrity of the vacuum during a vacuum bagging operation. As a result, technician time for installation of a vacuum bagging system is reduced and the need for rework associated with perforating the flexible sheet of material 154 is avoided. In addition, the flexible sheet of material 154 may be reused numerous times, unlike with conventional vacuum bagging systems.

In some examples, the network 104 of fluid lines 116 may be described as comprising one or more subnetworks 119 of the fluid lines 116. In such examples, each subnetwork 119 is configured to be selectively and fluidically coupled to more than one of the stringer bladders 118 that are positioned within the stringer forms 108 of the layup mandrel 102 so that the stringer bladders 118 are fluidically open to atmosphere 120. In some such examples, each subnetwork 119 comprises a main line 121 and a plurality of jumper lines 122 that extend from the main line 121. The main line 121 also may be referred to or described as a manifold 121. Each jumper line 122 is configured to extend to a respective stringer bladder 118 that is positioned relative to the layup mandrel 102. In some such examples, each jumper line 122 comprises a bladder-side jumper quick-connect fitting 124 that is configured to be operatively coupled to a corresponding bladder quick-connect fitting 126 of a respective bladder 118 of the plurality stringer bladders 118. In particular, each bladder 118 may comprise a bladder vent plug 158 positioned at a terminal end of the bladder 118 and that effectively closes the hollow interior of the bladder 118 but for the connection to a vent line, such as a jumper line 122 via a quick-connect fitting assembly between the jumper line 122 and bladder vent plug 158.

Similarly, in some examples, each jumper line 122 may comprise a manifold-side jumper quick-connect fitting 125, and the main line 121 may comprise a main-line quick-connect fitting 127 for each of the plurality of jumper lines 122 and configured to be selectively and repeatedly coupled to and uncoupled from a respective manifold-side jumper quick-connect fitting 125.

In some systems 100 that comprise subnetworks 119, the main line 121 extends through the layup mandrel 102 and is open to atmosphere 120. In such examples, the main line 121 may be described as a vent line 140.

In some examples, the layup mandrel 102 may comprise a face sheet 138, and each subnetwork 119 comprises a vent line 140 that is fluidically coupled to a respective main line 121 and that extends through the face sheet 138.

With continued reference to FIG. 4, some systems 100 further comprise a leak test kit 128 for leak testing the network 104 of the fluid lines 116, a subnetwork 119 of the fluid lines 116, and/or the stringer bladders 118. For example, the leak test kit 128 may comprise a gauge 130, a plurality of jumper-line caps 132, and an on/off valve 134. The gauge 130 is configured to be selectively coupled to a respective subnetwork 119 and may be a pressure gauge, a flow meter, or any other suitable mechanism capable of detecting a flow of fluid or change in pressure. The jumper-line caps 132 are configured to be selectively coupled to the plurality of jumper lines 122 to isolate the respective subnetwork 119 from atmosphere 120. The on/off valve 134 is associated with the gauge 130 and is configured to be operatively coupled to a source 133 of pressurized gas 146. Accordingly, the leak test kit 128 is configured to selectively couple to a subnetwork 119 to test the pressure integrity of the respective subnetwork 119. More specifically, the ends of the jumper lines 122 of a subnetwork 119 that are configured to be operatively coupled to the stringer bladders 118 are capped with the jumper-line caps 132, the gauge 130 and on/off valve 134 are coupled to the main line 121 or a vent line 140 of a subnetwork, and the source 133 of pressurized gas 146 is connected to the on/off valve 134. When the on/off 134 valve is turned on, the pressurized gas 146 will pressurize the respective subnetwork 119. Then the on/off valve 134 is closed, and the gauge 130 is monitored to detect any leaks throughout the subnetwork 119.

As schematically represented in FIG. 4, some systems 100 further comprise one or more covers 112 that are configured to be operatively coupled to the layup mandrel 102 to define a passage 114 extending along the layup mandrel 102. In such systems 100, the network 104 of fluid lines 116 is positioned at least partially within the passage 114 when the one or more covers 112 are operatively coupled to the layup mandrel 102. The cover(s) 112 and the creation of the passage 114 along the open ends 110 of the stringer forms 108 may serve at least two purposes. First, the passage 114 provides a volume of space where components associated with the layup mandrel 102, such as the network 104 of fluid lines 116, and the assembly of stiffened composite structures 12 may be positioned and protected or otherwise shielded, such as from being engaged by a flexible sheet of material 154 of a vacuum bagging system 144. Stated differently, the cover(s) 112 may protect the flexible sheet of material 154 from engagement with components positioned within the passage 114, thereby avoiding undesirable wear and tear on the flexible sheet of material 154, and resulting in a longer use life of the flexible sheet of material 154.

In some examples, as schematically represented in FIG. 4, the cover(s) 112 may comprise a smooth outer surface 141 that is suitable to interface with the flexible sheet of material 154 of a vacuum bagging system 144. In other words, not only do the cover(s) 112 protect the flexible sheet of material 154 from the components within the passage 114, but the cover(s) 112 themselves may be configured to avoid undesirable wear and tear of the flexible sheet of material 154. That is, the cover(s) 112 may not have any sharp edges or corners that are positioned to engage the flexible sheet of material 154 during a vacuum bagging operation. As a result, the flexible sheet of material 154 may be reused numerous times without replacement, unlike with conventional vacuum bagging systems.

In systems 100, whose layup mandrel 102 is an inner mold line layup mandrel with a plurality of stringer forms 108 with open ends 110, the one or more covers 112 are configured to cover the open end 110 of each stringer form 108, such that the passage 114 extends transverse to the plurality of spaced-apart stringer forms 108. The cover(s) 112 and the layup mandrel 102 may have any suitable coupling mechanism or components operative to permit for the selective coupling of the cover(s) 112 to the layup mandrel 102 and for the selective uncoupling, or removal, of the cover(s) 112 from the layup mandrel 102. Examples of coupling mechanisms or components include magnets, fasteners, clips, and the like.

In some examples, the smooth outer surface 141 of the cover(s) comprises a first region 150 that is parallel to the primary skin contour 148 when the cover(s) 112 are operatively coupled to the layup mandrel 102. Accordingly, as schematically illustrated in FIG. 4, a flexible sheet of material 154 of a vacuum bagging system 144, when operatively installed, may smoothly transition from the first region 150 to a skin segment 38 or to an optional caul structure 156 that is placed over a skin segment 38 during a vacuum bagging operation of a stiffened composite structure 12. In some examples, the cover(s) 112 may be described as being rigid, so as to define the passage 114 when the cover(s) 112 are operatively coupled to the layup mandrel 102. The cover(s) 112 may be constructed of any suitable material, including plastics, fiber-reinforced plastics, metal, etc. In some examples, the cover(s) 112 may be constructed of the same material as the outer surface 106 of the layup mandrel 102.

In the example of a system 100 utilized to construct a stiffened composite structure 12 that is cylindrical or tubular, such as a barrel section 18 of a fuselage 16, the first region 150 therefore may be cylindrical or tubular. In some examples, the smooth outer surface 141 of the cover(s) 112 also comprises a second region 152 that extends at an angle from the first region 150. In some such examples, the second region 152 may be frustoconical.

With continued reference to FIG. 4, some systems 100 further comprise a network 104 of fluid lines 116 that are positioned at least partially within the passage 114 when the cover(s) 112 are operatively coupled to the layup mandrel 102.

With continued reference to FIG. 4, systems 100 may be described in a state of use. That is a system 100 may be described as comprising a plurality of stringers 36 and a skin segment 38 operatively positioned relative to the layup mandrel 102, and a plurality of stringer bladders 118 that are positioned within at least a subset of the plurality of stringers 36. Further, when in use, systems 100 that comprise cover(s) 112, the cover(s) 112 are operatively coupled to the layup mandrel 102, and the system 100 further comprises a vacuum bagging system 144 that is operatively installed relative to the layup mandrel 102 to compact the plurality of stringers 36 and the skin segment 38 together. In particular, in some such systems 100, the vacuum bagging system 144 comprises a flexible sheet of material 154 that extends over the one or more covers 112. In some installations of systems 100, the cover(s) 112 do not engage the stringers 36 and the skin segment 38.

Turning now to FIGS. 5-8, an illustrative non-exclusive example of systems 100 is illustrated in the form of a system 300. Where appropriate, the reference numerals from the schematic illustration of FIG. 4 are used to designate corresponding parts of system 300; however, system 300 is non-exclusive and does not limit systems 100 to the illustrated embodiment of FIGS. 5-8. That is, systems 100 may incorporate any number of the various aspects, configurations, characteristics, properties, etc. of systems 100 that are illustrated in and discussed with reference to the schematic representations of FIG. 4 and/or the embodiments of FIGS. 5-8, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to system 300; however, it is within the scope of the present disclosure that the previously discussed features, variants, etc. may be utilized with system 300.

Figure 5:
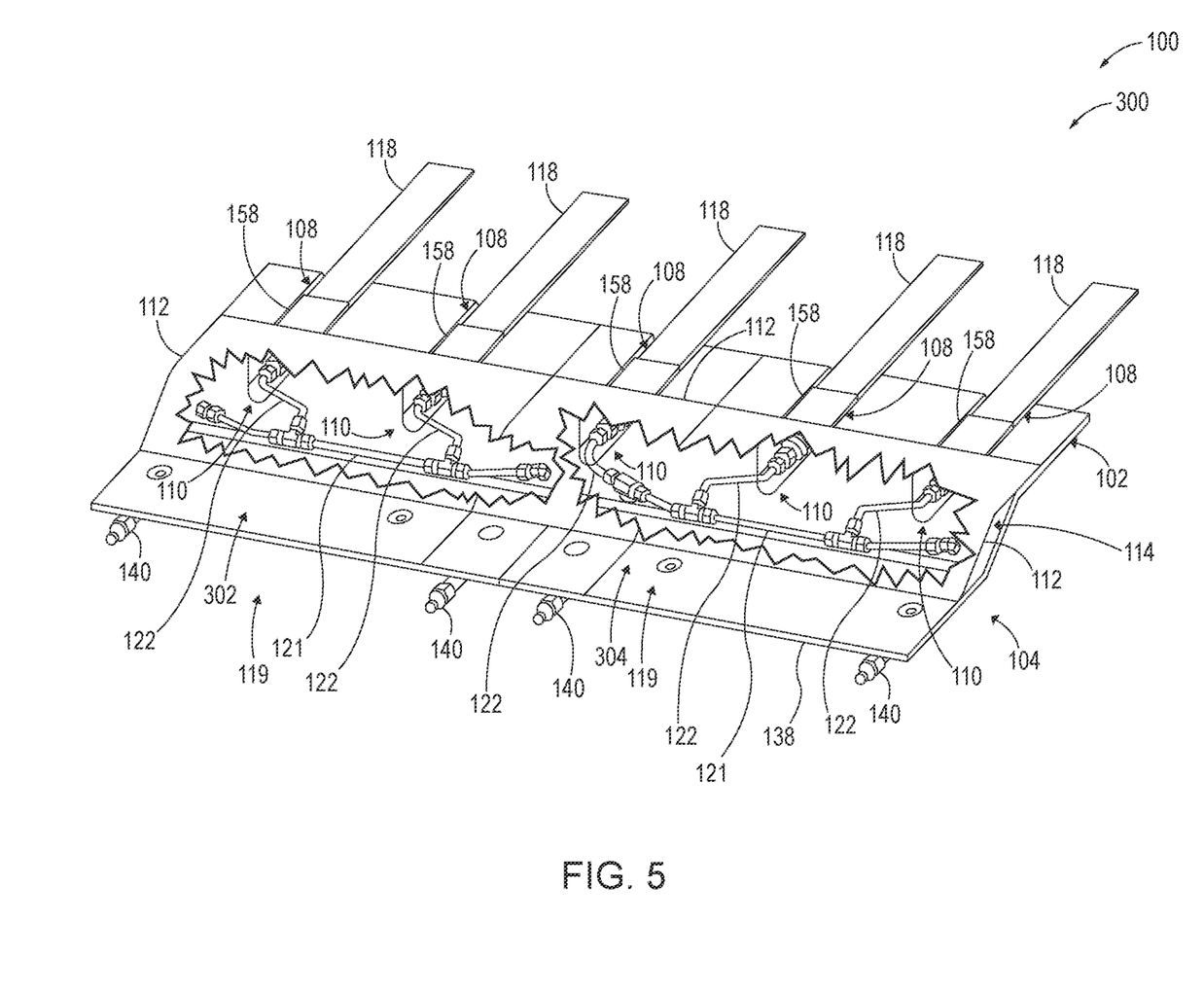
FIG. 5 am isometric view of a portion of an example of a system for assembling stiffened composite structures, shown in a cure configuration.

FIG. 5 illustrates system 300 with three covers 112 operatively coupled to a layup mandrel 102 in the form of an inner mold line layup mandrel with a plurality of spaced-apart stringer forms 108. The example layup mandrel may be described as a segmented layup mandrel with a joint line that coincides at a stringer form 108. For clarity, in FIG. 5, the corresponding stringers 36 and skin segment(s) 38 that would be compacted utilizing the illustrated system 300 are not shown. In particular, system 300 comprises two subnetworks 119 of fluid lines 116. A first subnetwork 302 comprises a main line 121, two jumper lines 122, and two vent lines 140. A second subnetwork 304 comprises a main line 121, three jumper lines 122, and two vent lines 140.

Figure 6:
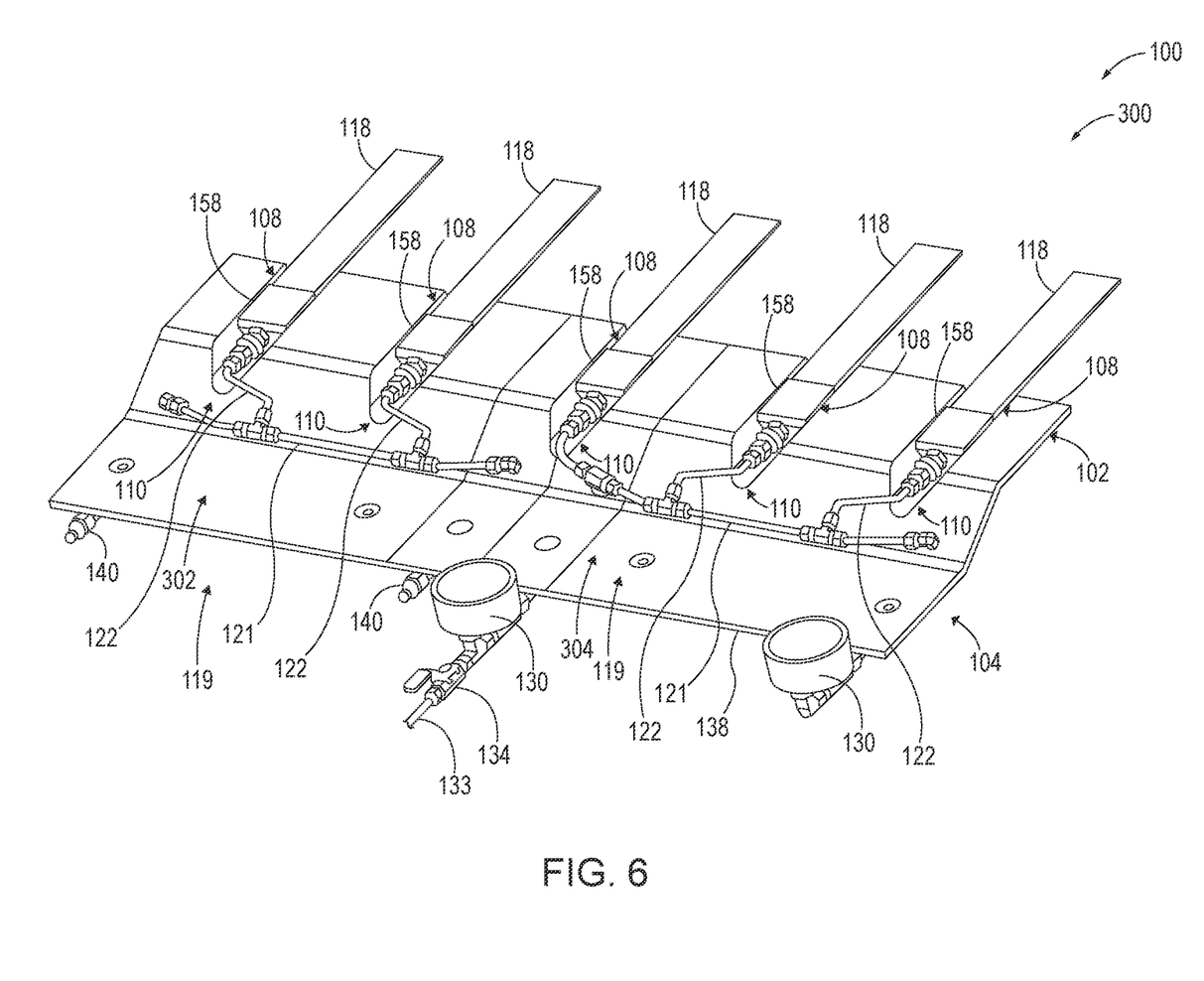
FIG. 6 is another isometric view of the portion of the example system of FIG. 5, shown in a bladder leak test configuration.

FIG. 6 illustrates system 300 but with the covers 112 removed from the layup mandrel 102 and with a leak test kit 128 installed on the subnetwork 304. More specifically, a first gauge 130 is installed on one of the two vent lines 140, and a second gauge 130 with an on/off valve 134 is installed on the other of the two vent lines 140 with a source 133 of pressurized gas 146 coupled thereto. The jumper lines 122 of the subnetwork 304 are connected to the respective stringer bladders 118. Accordingly, the subnetwork 304 and the associated stringer bladders 118 are pressurized. When the on/off valve 134 is closed, the gauges 130 may be monitored to determine if any leaks are present.

Figure 7:
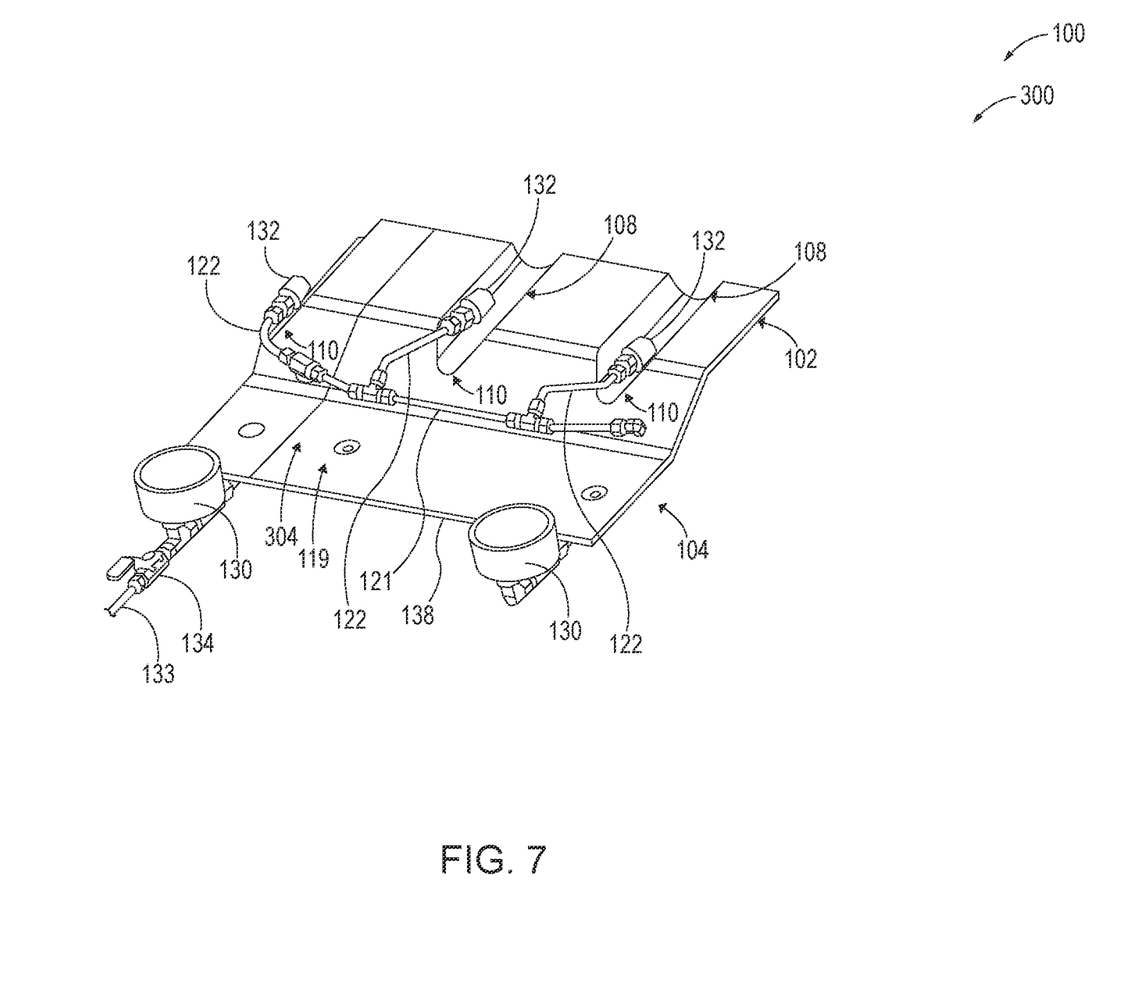
FIG. 7 is another isometric view of a portion of the example system of FIG. 5, shown in a manifold leak test configuration.
Figure 8:
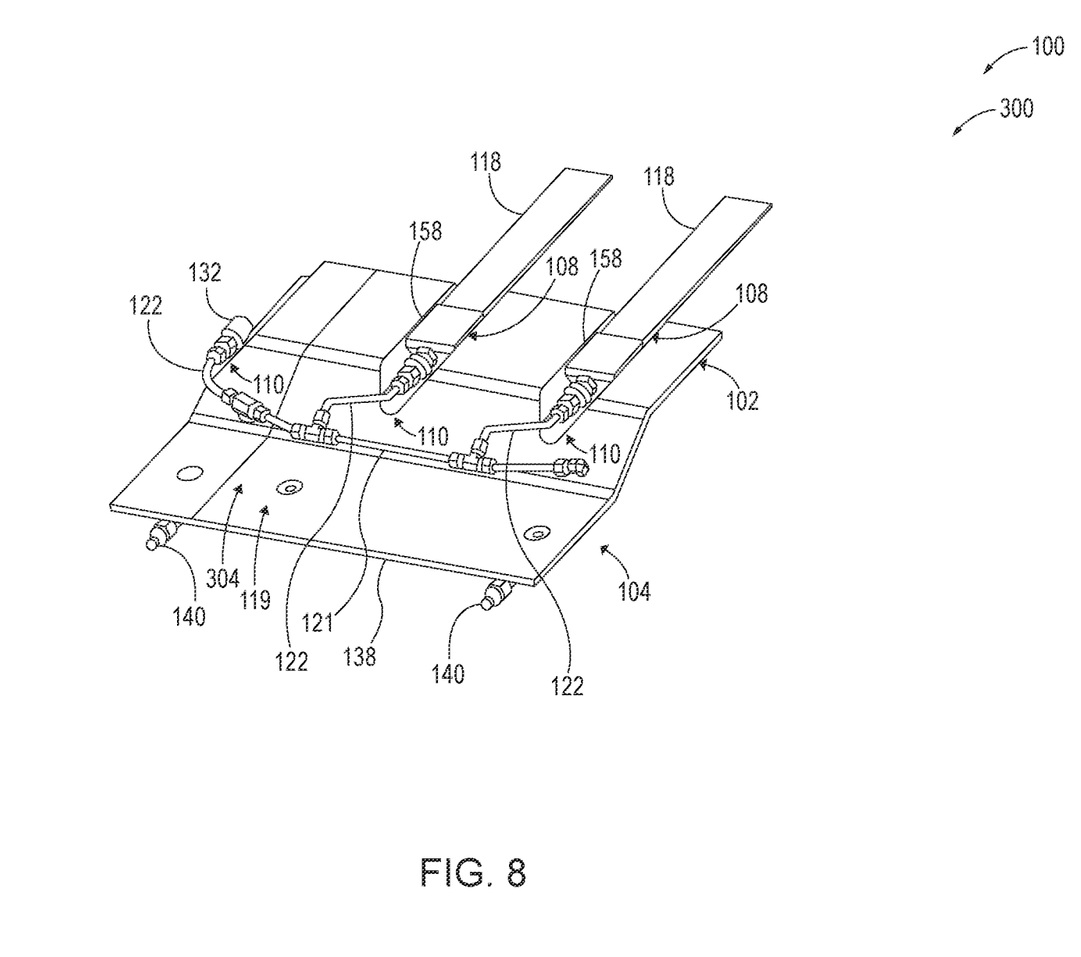
FIG. 8 is another isometric view of a portion of the example system of FIG. 5, shown in a configuration with one stringer and bladder absent.

FIG. 7 illustrates a portion of system 300 comprising the subnetwork 304, again with the covers 112 removed from the layup mandrel 102 and with a leak test kit 128 installed on the subnetwork 304. However, in contrast to FIG. 6, the stringer bladders 118 are not present, and jumper-line caps 132 are operatively coupled to the jumper lines 122. Accordingly, as illustrated, the subnetwork 304, by itself, is pressurized, and when the on/off valve 134 is closed, the gauges 130 may be monitored to determine if any leaks are present in the subnetwork 304.

FIG. 8 again illustrates the portion of system 300 comprising the subnetwork 304. Again, in FIG. 8, the covers 112 are moved from the layup mandrel. Two stringer bladders 118 are present and operatively coupled to corresponding jumper lines 122. A third jumper line 122 is capped with a jumper-line cap 132, illustrating that a system 100 may be installed and utilized in connection with fewer than the total possible number of stringer bladders 118

Figure 9:
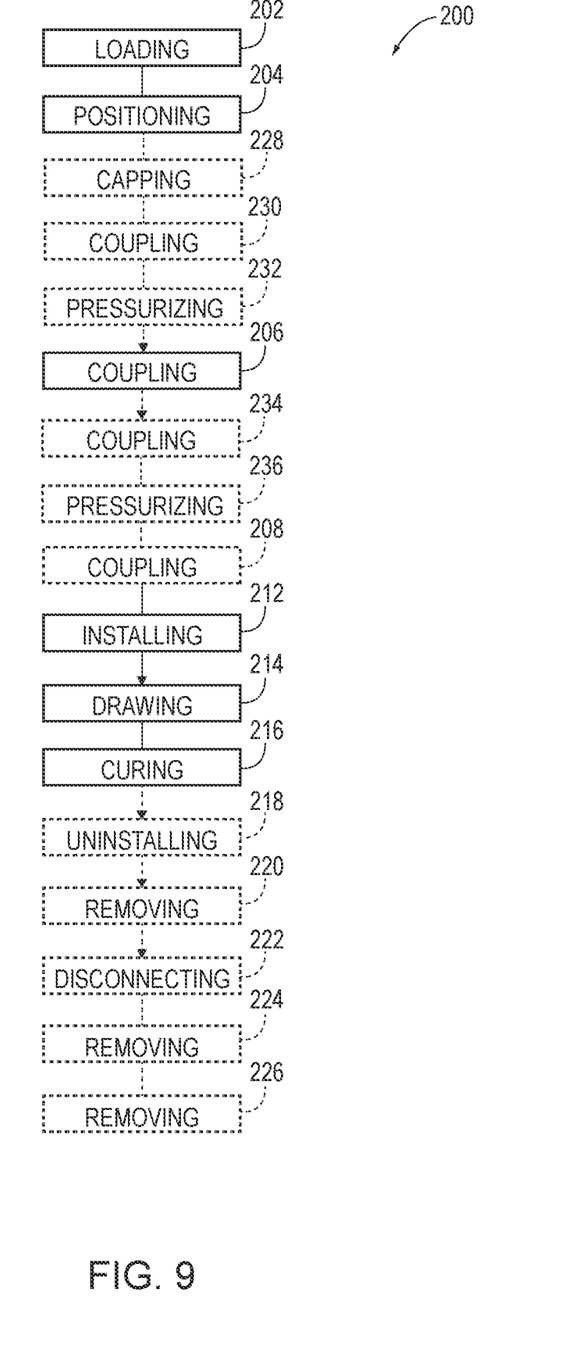
FIG. 9 is a flowchart schematically representing methods of assembling stiffened composite structures.

FIG. 9 schematically provides a flowchart that represents illustrative, non-exclusive examples of methods 200 according to the present disclosure. In FIG. 9, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 9 are not limiting and other methods and steps are within the scope of the present disclosure, including methods having greater than or fewer than the number of steps illustrated, as understood from the discussions herein.

Methods 200 of utilizing a system 100 comprise operatively loading 202 stringers 36 and a skin segment 38 relative to a layup mandrel 102, and positioning 204 stringer bladders 118 into stringer cavities of the stringers 36. In methods 200 utilizing an inner mold line layup mandrel with a plurality of spaced-apart stringer forms 108, the stringers 36 are positioned within the stringer forms 108. In some methods 200, the stringers 36 and the stringer bladders 118 may be kitted away from the layup mandrel 102 and loaded on the layup mandrel 102 together. In other methods 200, the stringers 36 may be positioned in the stringer forms 108 of the layup mandrel 102 before the stringer bladders 118 are positioned within the cavities of the stringers 36

Methods 200 further comprise fluidically coupling 206 the stringer bladders 118 to a network 104 of fluid lines 116 so that the internal volumes 136 of the stringer bladders 118 are fluidically open to atmosphere 120, and operatively installing 212 a vacuum bagging system 144 relative to the layup mandrel 102, the stringers 36, and the skin segment 38 that loaded on the layup mandrel 102. Following the operatively installing 212 the vacuum bagging system 144, methods 200 comprise drawing 214 a vacuum on the stringers 36 and the skin segment 38 while maintaining atmospheric pressure of the stringer bladders 118 via the network 104 of fluid lines 116. Methods 200 further comprise concurrently with the drawing 214 the vacuum, curing 216 the stringers 36 and the skin segment 38.

In methods 200 that utilize a system 100 that comprises one more covers 112, such methods 200 also may comprise, following the fluidically coupling 206, operatively coupling 208 one or more covers 112 to the layup mandrel 102 to define a passage 114.

As schematically represented in FIG. 9, some methods 200 further comprise, following the curing 216, uninstalling 218 the vacuum bagging system 144 from the layup mandrel 102, and following the uninstalling 218, removing 220 the one or more covers 112 from the layup mandrel 102. In addition in such examples of methods 200, following the removing 220 the one or more covers 112, methods 200 further comprise disconnecting 222 the stringer bladders 118 from the network 104 of fluid lines 116, and removing 224 the stringer bladders 118 from the stringers 36. Following the uninstalling 218, such methods 200 also comprise removing 226 the stringers 36 and the skin segment 38 from the layup mandrel 102.

Some methods 200 further comprise prior to the fluidically coupling 206 the stringer bladders 118 to the network 104 of fluid lines 116, capping 228 the plurality of jumper lines 122 of a respective subnetwork 119, operatively coupling 230 a gauge 130 to the respective subnetwork 119, and pressurizing 232 the respective subnetwork 119 to leak test the respective subnetwork 119.

Some methods 200 further comprise, following the fluidically coupling 206 the stringer bladders 118 to the network 104 of fluid lines 116, operatively coupling 234 a gauge 130 to the respective subnetwork 119, and pressurizing 236 the respective subnetwork 119 and the stringer bladders 118 fluidically coupled to the respective subnetwork 119 to leak test the stringer bladders 118 that are fluidically coupled to the respective subnetwork 119.

Illustrative, non-exclusive examples of inventive subject matter according to the present disclosure are described in the following enumerated paragraphs:

A. A system (100) for assembling stiffened composite structures (12), the system (100) comprising:
 a layup mandrel (102) comprising an outer surface (106); and
 a network (104) of fluid lines (116), wherein the network (104) of fluid lines (116) is configured to be selectively and fluidically coupled to stringer bladders (118) positioned relative to the layup mandrel (102).

A1. The system (100) of paragraph A, wherein the network (104) of fluid lines (116) is fluidically open to atmosphere (120) so that internal volumes (136) of the stringer bladders (118), when fluidically coupled to the network (104) of fluid lines (116), are fluidically open to atmosphere (120).

A2. The system (100) of any of paragraphs A-A1, wherein the network (104) of fluid lines (116) extends through the layup mandrel (102).

A3. The system (100) of any of paragraphs A-A2, wherein the network (104) of fluid lines (116) comprises one or more subnetworks (119) of the fluid lines (116), wherein each subnetwork (119) of the one or more subnetworks (119) is configured to be selectively and fluidically coupled to more than one of the stringer bladders (118) so that the more than one of the stringer bladders (118) are fluidically open to atmosphere (120).

A3.1. The system (100) of paragraph A3, wherein each subnetwork (119) of the one or more subnetworks (119) comprises a main line (121) and a plurality of jumper lines (122) extending from the main line (121), wherein each jumper line (122) of the plurality of jumper lines (122) is configured to be operatively coupled to a respective stringer bladder (118) of the stringer bladders (118).

A3.1.1. The system (100) of paragraph A3.1, wherein each jumper line (122) of the plurality of jumper lines (122) comprises a bladder-side jumper quick-connect fitting (124) configured to be operatively coupled to a corresponding bladder quick-connect fitting (126) of the respective bladder (118) of the stringer bladders (118).

A3.1.2. The system (100) of any of paragraphs A3.1-A3.1.1, wherein each jumper line (122) of the plurality of jumper lines (122) comprises a manifold-side jumper quick-connect fitting (125), and wherein the main line (121) comprises a main-line quick-connect fitting (127) for each jumper line (122) of the plurality of jumper lines (122).

A3.1.3. The system (100) of any of paragraphs A3.1-A3.1.2, wherein the main line (121) of each subnetwork (119) of the one or more subnetworks (119) extends through the layup mandrel (102).

A3.1.4. The system (100) of any of paragraphs A3.1-A3.1.3, wherein the layup mandrel (102) comprises a face sheet (138), wherein each subnetwork (119) of the one or more subnetworks (119) further comprises at least one vent line (140), and wherein each vent line (140) is fluidically coupled to a respective main line (121) through the face sheet (138).

A3.2. The system (100) of any of paragraphs A3-A3.1.4, further comprising a leak test kit (128) comprising:
 a gauge (130) configured to be selectively coupled to a respective subnetwork (119) of the one or more subnetworks (119);
 a plurality of jumper-line caps (132) configured to be selectively coupled to the plurality of jumper lines (122); and
 an on/off valve (134) associated with the gauge (130) and configured to be operatively coupled to a source (133) of pressurized gas (146);
 wherein the leak test kit (128) is configured to selectively pressurize the respective subnetwork (119) of the one or more subnetworks (119) of the fluid lines (116) to test pressure integrity of the respective subnetwork (119).

A4. The system (100) of any of paragraphs A-A3.2, further comprising:
 one or more covers (112) configured to be operatively coupled to the layup mandrel (102) to define a passage (114) extending along the layup mandrel (102);
 wherein the network (104) of fluid lines (116) is positioned at least partially within the passage (114) when the one or more covers (112) are operatively coupled to the layup mandrel (102), and wherein the network (104) of fluid lines (116) is configured to be selectively and fluidically coupled to the stringer bladders (118) when positioned relative to the layup mandrel (102).

A4.1. The system (100) of paragraph A4, wherein the one or more covers (112) comprise a smooth outer surface (141) suitable to interface with a flexible sheet of material (154) of a vacuum bagging system (144).

A4.2. The system of any of paragraphs A4-A4.1,
 wherein the outer surface (106) of the layup mandrel (102) defines a plurality of spaced-apart stringer forms (108) extending longitudinally along the outer surface (106), wherein each stringer form (108) of the plurality of spaced-apart stringer forms (108) comprises an open end (110);
 wherein when the one or more covers (112) are operatively coupled to the layup mandrel (102), the one or more covers (112) cover the open end (110) of each stringer form (108) of the plurality of spaced-apart stringer forms (108), and the passage (114) extends transverse to the plurality of spaced-apart stringer forms (108); and
 wherein the network (104) of fluid lines (116) is configured to be selectively and fluidically coupled to the stringer bladders (118) when positioned within the plurality of spaced-apart stringer forms (108).

A4.2.1. The system (100) of paragraph A4.2 when depending from paragraph A4.1, wherein the outer surface (106) of the layup mandrel (102) defines a primary skin contour (148), and wherein the smooth outer surface (141) of the one or more covers (112) comprises a first region (150) that is parallel to the primary skin contour (148) when operatively coupled to the layup mandrel (102).

A4.2.1.1. The system (100) of paragraph A4.2.1, wherein the smooth outer surface (141) of the one or more covers (112) comprises a second region (152) that extends at an angle from the first region (150).

A4.2.1.1.1. The system (100) of paragraph A4.2.1.1, wherein the first region (150) is cylindrical, and wherein the second region (152) is frustoconical.

A5. The system (100) of any of paragraphs A-A4.2.1.1.1, further comprising:
- a plurality of stringers (36) and a skin segment (38) operatively positioned relative to the layup mandrel (102); and
- a plurality of stringer bladders (118) positioned within at least a subset of the plurality of stringers (36).

A5.1. The system (100) of paragraph A5 when depending from paragraph A4, wherein the one or more covers (112) are operatively coupled to the layup mandrel (102), and wherein the system (100) further comprises a/the vacuum bagging system (144) operatively installed relative to the layup mandrel (102) to compact the plurality of stringers (36) and the skin segment (38).

A5.1.1. The system (100) of paragraph A5.1, wherein the vacuum bagging system (144) comprises a/the flexible sheet of material (154) extending over the one or more covers (112).

A5.1.1.1. The system (100) of paragraph A5.1.1, wherein the fluid lines (116) do not penetrate the flexible sheet of material (154).

A5.1.2. The system (100) of any of paragraphs A5.1-A5.1.1.1, wherein the one or more covers (112) do not engage the plurality of stringers (36) and the skin segment (38).

A6. The system (100) of any of paragraphs A-A5.1.2, wherein the layup mandrel (102) corresponds to at least a portion of a fuselage (16) of an aircraft (14).

A7. The use of the system (100) of any of paragraphs A-A6 to assemble a/the stiffened composite structure (12).

B. A method (200) of utilizing the system (100) of any of paragraphs A-A7, the method (200) comprising:
- operatively loading (202) stringers (36) and a/the skin segment (38) relative to the layup mandrel (102);
- positioning (204) the stringer bladders (118) into stringer cavities of the stringers (36);
- fluidically coupling (206) the stringer bladders (118) to the network (104) of fluid lines (116) so that the internal volumes (136) of the stringer bladders (118) are fluidically open to atmosphere (120);
- operatively installing (212) a/the vacuum bagging system (144) relative to the layup mandrel (102), the stringers (36), and the skin segment (38);
- following the operatively installing (212) the vacuum bagging system (144), drawing (214) a vacuum on the stringers (36) and the skin segment (38) while maintaining atmospheric pressure of the stringer bladders (118) via the network (104) of fluid lines (116); and
- concurrently with the drawing (214) the vacuum, curing (216) the stringers (36) and the skin segment (38).

B1. The method (200) of paragraph B when depending from paragraph A4, further comprising:
- following the fluidically coupling (206), operatively coupling (208) the one or more covers (112) to the layup mandrel (102) to define the passage (114).

B1.1. The method (200) of paragraph B1, further comprising:
- following the curing (216), uninstalling (218) the vacuum bagging system (144) from the layup mandrel (102);
- following the uninstalling (218), removing (220) the one or more covers (112) from the layup mandrel (102);
- following the removing (220) the one or more covers (112):
  - disconnecting (222) the stringer bladders (118) from the network (104) of fluid lines (116); and
  - removing (224) the stringer bladders (118) from the stringers (36); and
- following the uninstalling (218), removing (226) the stringers (36) and the skin segment (38) from the layup mandrel (102).

B2. The method (200) of any of paragraphs B-B1.1 when depending from paragraph A3.1, further comprising, prior to the fluidically coupling (206) the stringer bladders (118) to the network (104) of fluid lines (116):
- capping (228) the plurality of jumper lines (122) of a respective subnetwork (119);
- operatively coupling (230) a gauge (130) to the respective subnetwork (119); and
- pressurizing (232) the respective subnetwork (119) to leak test the respective subnetwork (119).

B3. The method (200) of any of paragraphs B-B2 when depending from paragraph A3.1, further comprising, following the fluidically coupling (206) the stringer bladders (118) to the network (104) of fluid lines (116):
- operatively coupling (234) a/the gauge (130) to the respective subnetwork (119); and
- pressurizing (236) the respective subnetwork (119) and the stringer bladders (118) fluidically coupled to the respective subnetwork (119) to leak test the stringer bladders (118) fluidically coupled to the respective subnetwork (119).

B4. The method (200) of any of paragraphs B-B3, wherein the operatively installing (212) does not comprise penetrating a/the flexible sheet of material (154) of the vacuum bagging system (144) with the fluid lines (116). As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A system for assembling stiffened composite structures, the system comprising:
  a layup mandrel comprising an outer surface;
  a network of fluid lines, wherein the network of fluid lines is configured to be selectively and fluidically coupled to stringer bladders positioned relative to the layup mandrel, and wherein the network of fluid lines extends through the layup mandrel; and
  one or more covers configured to be operatively coupled to the layup mandrel to define a passage extending along the layup mandrel;
  wherein the network of fluid lines is positioned at least partially within the passage when the one or more covers are operatively coupled to the layup mandrel, and wherein the network of fluid lines is configured to be selectively and fluidically coupled to the stringer bladders when positioned relative to the layup mandrel.

2. The system of claim 1, wherein the network of fluid lines is fluidically open to atmosphere so that internal volumes of the stringer bladders, when fluidically coupled to the network of fluid lines, are fluidically open to atmosphere.

3. The system of claim 1, wherein the network of fluid lines comprises one or more subnetworks of the fluid lines, wherein each subnetwork of the one or more subnetworks is configured to be selectively and fluidically coupled to more than one of the stringer bladders so that the more than one of the stringer bladders are fluidically open to atmosphere.

4. The system of claim 3, wherein each subnetwork of the one or more subnetworks comprises a main line and a plurality of jumper lines extending from the main line, wherein each jumper line of the plurality of jumper lines is configured to be operatively coupled to a respective stringer bladder of the stringer bladders.

5. The system of claim 4, wherein each jumper line of the plurality of jumper lines comprises a bladder-side jumper quick-connect fitting configured to be operatively coupled to a corresponding bladder quick-connect fitting of the respective stringer bladder of the stringer bladders.

6. The system of claim 4, wherein each jumper line of the plurality of jumper lines comprises a manifold-side jumper quick-connect fitting, and wherein the main line comprises a main-line quick-connect fitting for each jumper line of the plurality of jumper lines.

7. The system of claim 4, wherein the main line of each subnetwork of the one or more subnetworks extends through the layup mandrel.

8. The system of claim 4, wherein the layup mandrel comprises a face sheet, wherein each subnetwork of the one or more subnetworks further comprises at least one vent line, and wherein each vent line is fluidically coupled to a respective main line through the face sheet.

9. The system of claim 3, further comprising a leak test kit comprising:
  a gauge configured to be selectively coupled to a respective subnetwork of the one or more subnetworks;
  a plurality of jumper-line caps configured to be selectively coupled to the plurality of jumper lines; and
  an on/off valve associated with the gauge and configured to be operatively coupled to a source of pressurized gas;
  wherein the leak test kit is configured to selectively pressurize the respective subnetwork of the one or more subnetworks of the fluid lines to test pressure integrity of the respective subnetwork.

10. The system of claim 1, wherein the one or more covers comprise a smooth outer surface suitable to interface with a flexible sheet of material of a vacuum bagging system.

11. The system of claim 1,
  wherein the outer surface of the layup mandrel defines a plurality of spaced-apart stringer forms extending longitudinally along the outer surface, wherein each stringer form of the plurality of spaced-apart stringer forms comprises an open end;
  wherein when the one or more covers are operatively coupled to the layup mandrel, the one or more covers cover the open end of each stringer form of the plurality of spaced-apart stringer forms, and the passage extends transverse to the plurality of spaced-apart stringer forms; and
  wherein the network of fluid lines is configured to be selectively and fluidically coupled to the stringer bladders when positioned within the plurality of spaced-apart stringer forms.

12. The system of claim 11, wherein the one or more covers comprise a smooth outer surface suitable to interface with a flexible sheet of material of a vacuum bagging system, wherein the outer surface of the layup mandrel defines a primary skin contour, and wherein the smooth outer surface of the one or more covers comprises a first region that is parallel to the primary skin contour when operatively coupled to the layup mandrel.

13. The system of claim 12, wherein the smooth outer surface of the one or more covers comprises a second region that extends at an angle from the first region.

14. The system of claim 13, wherein the first region is cylindrical, and wherein the second region is frustoconical.

15. The system of claim 11, further comprising:
  a plurality of stringers positioned within at least a subset of the plurality of spaced-apart stringer forms;
  a plurality of stringer bladders positioned within at least a subset of the plurality of stringers positioned within at least the subset of the plurality of spaced-apart stringer forms; and
  a skin segment positioned over the plurality of stringers and the plurality of stringer bladders.

16. The system of claim 15, wherein the one or more covers are operatively coupled to the layup mandrel, and wherein the system further comprises a vacuum bagging system operatively installed relative to the layup mandrel to compact the plurality of stringers and the skin segment.

17. The system of claim 16, wherein the vacuum bagging system comprises a flexible sheet of material extending over the one or more covers, and wherein the fluid lines do not penetrate the flexible sheet of material.

18. The system of claim 16, wherein the one or more covers do not engage the plurality of stringers and the skin segment.

19. The system of claim 11, wherein the layup mandrel corresponds to at least a portion of a fuselage of an aircraft, and wherein the plurality of spaced-apart stringer forms correspond to stringers of the fuselage.

20. A method of utilizing the system of claim 1, the method comprising:
 operatively loading stringers and a skin segment relative to the layup mandrel;
 positioning the stringer bladders into stringer cavities of the stringers;
 fluidically coupling the stringer bladders to the network of fluid lines so that internal volumes of the stringer bladders are fluidically open to atmosphere;
 operatively installing a vacuum bagging system relative to the layup mandrel, the stringers, and the skin segment;
 following the operatively installing the vacuum bagging system, drawing a vacuum on the stringers and the skin segment while maintaining atmospheric pressure of the stringer bladders via the network of fluid lines; and
 concurrently with the drawing the vacuum, curing the stringers and the skin segment.

21. A system for assembling stiffened composite structures, the system comprising:
 a layup mandrel comprising an outer surface;
 a network of fluid lines, wherein the network of fluid lines is configured to be selectively and fluidically coupled to stringer bladders positioned relative to the layup mandrel; and
 one or more covers configured to be operatively coupled to the layup mandrel to define a passage extending along the layup mandrel;
 wherein the network of fluid lines is positioned at least partially within the passage when the one or more covers are operatively coupled to the layup mandrel, and wherein the network of fluid lines is configured to be selectively and fluidically coupled to the stringer bladders when positioned relative to the layup mandrel.

22. A system for assembling stiffened composite structures, the system comprising:
 a layup mandrel comprising an outer surface; and
 a network of fluid lines, wherein the network of fluid lines is configured to be selectively and fluidically coupled to stringer bladders positioned relative to the layup mandrel, and wherein the network of fluid lines extends through the layup mandrel;
 wherein the network of fluid lines comprises one or more subnetworks of the fluid lines, wherein each subnetwork of the one or more subnetworks is configured to be selectively and fluidically coupled to more than one of the stringer bladders so that the more than one of the stringer bladders are fluidically open to atmosphere;
 wherein each subnetwork of the one or more subnetworks comprises a main line and a plurality of jumper lines extending from the main line, wherein each jumper line of the plurality of jumper lines is configured to be operatively coupled to a respective stringer bladder of the stringer bladders; and
 wherein the layup mandrel comprises a face sheet, wherein each subnetwork of the one or more subnetworks further comprises at least one vent line, and wherein each vent line is fluidically coupled to a respective main line through the face sheet.

23. A system for assembling stiffened composite structures, the system comprising:
 a layup mandrel comprising an outer surface;
 a network of fluid lines, wherein the network of fluid lines is configured to be selectively and fluidically coupled to stringer bladders positioned relative to the layup mandrel, wherein the network of fluid lines extends through the layup mandrel, wherein the network of fluid lines comprises one or more subnetworks of the fluid lines, and wherein each subnetwork of the one or more subnetworks is configured to be selectively and fluidically coupled to more than one of the stringer bladders so that the more than one of the stringer bladders are fluidically open to atmosphere; and
 a leak test kit comprising:
  a gauge configured to be selectively coupled to a respective subnetwork of the one or more subnetworks;
  a plurality of jumper-line caps configured to be selectively coupled to the plurality of jumper lines; and
  an on/off valve associated with the gauge and configured to be operatively coupled to a source of pressurized gas;
 wherein the leak test kit is configured to selectively pressurize the respective subnetwork of the one or more subnetworks of the fluid lines to test pressure integrity of the respective subnetwork.

* * * * *